(12) United States Patent
Mellon et al.

(10) Patent No.: US 7,795,745 B2
(45) Date of Patent: Sep. 14, 2010

(54) FUEL TANK FOR A POWER GENERATOR SET (75) Inventors: Tyson Mellon, Francesville, IN (US); Shawn Stachler, Buffalo, IN (US); Joseph Willis, West Lafayette, IN (US)

(73) Assignee: Girtz Industries, Monticello, IN (US)

( * ) Notice: Subject to any disclaimer, the term of this patent is extended or adjusted under 35 U.S.C. 154(b) by 349 days.

(21) Appl. No.: 11/944,513

(22) Filed: Nov. 23, 2007

(65) Prior Publication Data

US 2008/0185048 A1 Aug. 7, 2008

Related U.S. Application Data (60) Provisional application No. 60/866,989, filed on Nov. 22, 2006.

(51) Int. Cl.
*H02K 5/00* (2006.01)
*F01P 1/06* (2006.01)

(52) U.S. Cl. .................. 290/1 A; 290/1 B; 123/2

(58) Field of Classification Search .......... 290/1 A, 290/1 B, 2; 322/1; 123/2, 3
See application file for complete search history.

(56) References Cited

U.S. PATENT DOCUMENTS

| | | | |
|---|---|---|---|
| 2,840,870 A | | 7/1958 | Pohlman |
| 3,714,449 A | | 1/1973 | De Bella |
| 4,677,940 A | * | 7/1987 | Bracht et al. ................ 123/2 |
| 5,392,577 A | | 2/1995 | D'Onofrio, Jr. et al. |
| 5,433,175 A | * | 7/1995 | Hughes et al. ............... 123/2 |
| 5,624,589 A | * | 4/1997 | Latvis et al. ............... 219/133 |
| 5,678,512 A | | 10/1997 | Colton |
| 5,899,174 A | * | 5/1999 | Anderson et al. ............ 123/2 |
| 6,134,878 A | * | 10/2000 | Amako et al. .............. 60/801 |
| 6,230,667 B1 | * | 5/2001 | Stauffer et al. ............... 123/2 |
| 6,492,740 B2 | * | 12/2002 | Suzuki ...................... 290/1 A |
| 6,756,693 B2 | * | 6/2004 | Kennedy .................... 290/1 A |
| 7,023,101 B2 | * | 4/2006 | Wang ......................... 290/1 A |
| 7,034,410 B2 | * | 4/2006 | Kennedy .................... 290/1 A |
| 7,036,279 B2 | | 5/2006 | Crozzoli |
| 7,049,707 B2 | | 5/2006 | Wurtele |
| 7,193,333 B1 | * | 3/2007 | Kitch ......................... 290/1 A |
| 7,314,397 B2 | * | 1/2008 | Sodemann et al. ......... 440/89 R |
| 7,377,237 B2 | * | 5/2008 | Carney et al. ............. 123/41.31 |

* cited by examiner

*Primary Examiner*—Nicholas Ponomarenko
(74) *Attorney, Agent, or Firm*—John V. Daniluck; Bingham McHale LLP

(57) ABSTRACT

A fuel tank for a power generator set. The fuel tank includes an angled surface that directs cooling air from the power generator set at a direction out of the generator set enclosure. In some embodiments, the fuel tank is centrally located between a pair of generator sets within a single enclosure. The fuel tank is configured in some embodiments to direct air upward out of the enclosure.

18 Claims, 10 Drawing Sheets

FUEL TANK FOR A POWER GENERATOR SET

REFERENCE TO RELATED APPLICATIONS

The present application claims priority to U.S. Provisional Application Ser. No. 60/866,989, filed Nov. 22, 2007, incorporated herein by reference.

FIELD OF THE INVENTION

The present invention pertains to improvements in the packaging of power generator sets, especially with regards to the flow of ambient air into and out of the set enclosure.

SUMMARY OF THE INVENTION

The present inventions pertain to apparatus and methods for a fuel tank and a door for a power generator set.

One embodiment of the present invention includes a fuel tank which is configured and placed to deflect a flow of hot air from inside the generator enclosure to outside the generator enclosure.

Yet another embodiment of the present invention pertains to an arrangement for a power generator set in which there are two generator sets in alignment and placed back-to-back with a centrally located fuel tank that is adapted and configured to direct upward the cooling air from each individual generator set.

These and other features and aspects of different embodiments of the present invention will be apparent from the claims, specification, and drawings.

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The use of an N-series prefix for an element number (NXX) refers to an element that is the same as the non-prefixed element (XX), accept as shown and described thereafter. Although various specific quantities (spatial dimensions, temperatures, pressures, times, force, resistance, current, voltage, concentrations, etc.) may be stated herein, such specific quantities are presented as examples only, and are not to be construed as limiting.

The present invention includes various embodiments that relate to the entrance and exit of ambient air from an enclosure which contains a power generation set. In one embodiment, the set includes a fuel tank which is configured and placed so as to direct a flow of heated air in the vertical direction through an opening in the sealing of the enclosure. This vertical deflection reduces the possibility of the heated air from impinging on any personnel that are near the enclosure. Yet another embodiment of the present invention pertains to the use of a sound-deadening louver or blade in an access door. These louvers permit entrance of ambient air into the enclosure, while minimizing the transmission of sound from the generator to the environment of the power generation set.

The present invention further includes embodiments that pertain to an enclosure having a pair of power generator sets. In one embodiment, each generator set is arranged back-to-back with the other generator set, and in some embodiments further in general axial alignment. A fuel tank assembly is located inbetween the generator sets. Each generator set is adapted and configured to blow cooling air toward the centrally-located fuel tank. The fuel tank has a pair of sloping sides that deflect the airflow out of the enclosure. In some embodiments, the sides of the fuel tank are angled to direct the flow upward. In yet other embodiments the sides of the fuel tank are directed to direct flow laterally out of the enclosure.

Figure 1:
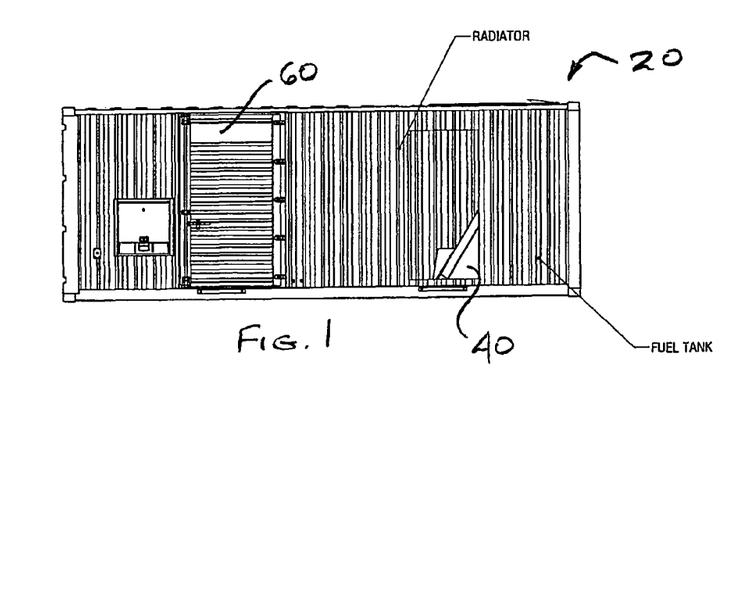
FIG. 1 is a side elevational view of a power generator set according to one embodiment of the present invention.
Figure 2:
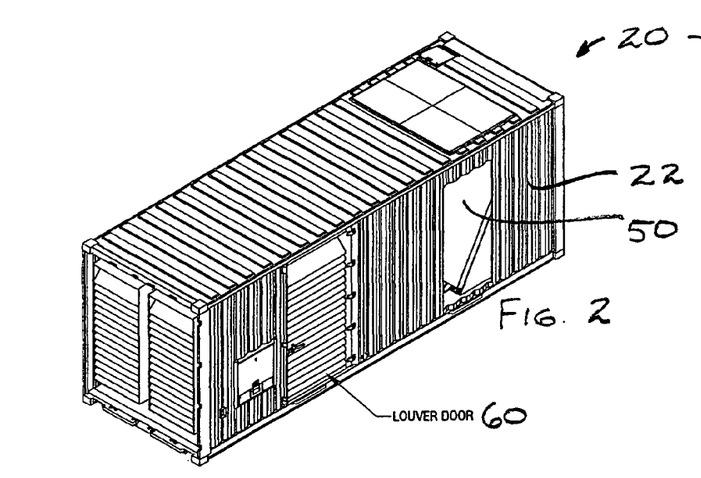
FIG. 2 is a front, top, left hand perspective view of the apparatus of FIG. 1.
Figure 3:
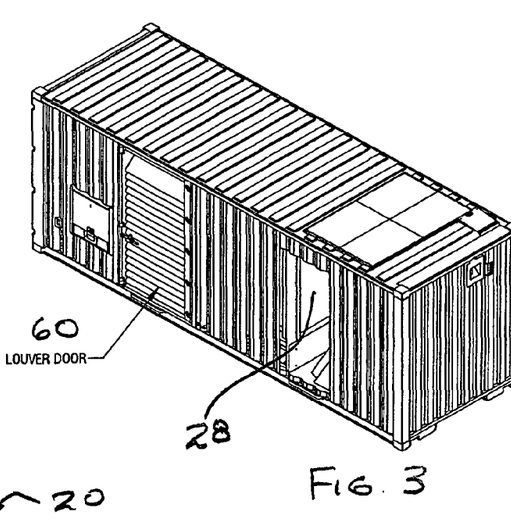
FIG. 3 is a top, front, right hand view of the apparatus of FIG. 1.

FIGS. 1, 2, and 3 show external views of an enclosed power generation unit 20 according to one embodiment of the present invention. Power generator 20 provides on-site electrical power, such as for peak topping, emergency power, or as primary power to the site. In one embodiment, assembly 20 is sold in 20 foot, 30 foot, and 40 foot versions.

Figure 4:
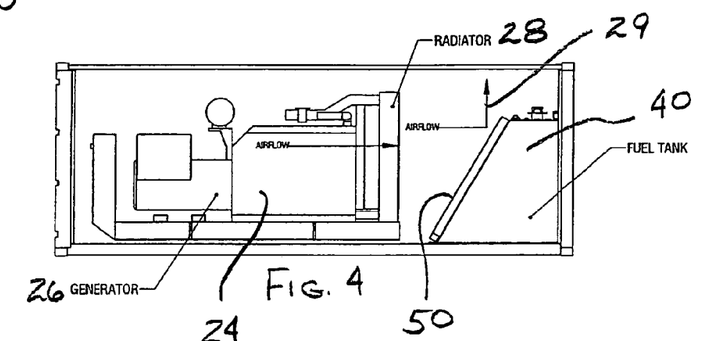
FIG. 4 is a schematic representation of the apparatus of FIG. 1 showing internal details.
Figure 5:
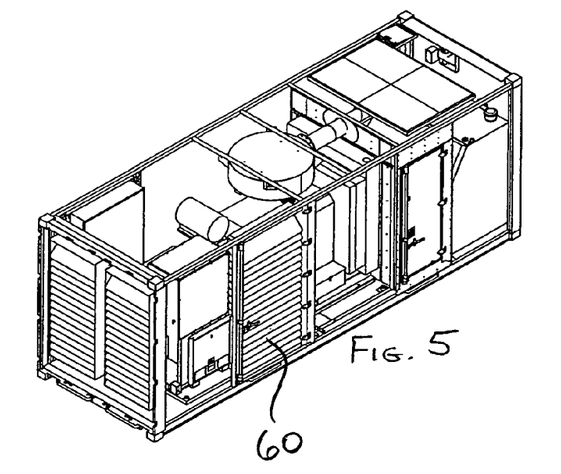
FIG. 5 is a schematic representation of the apparatus of FIG. 2 showing internal details.
Figure 6:
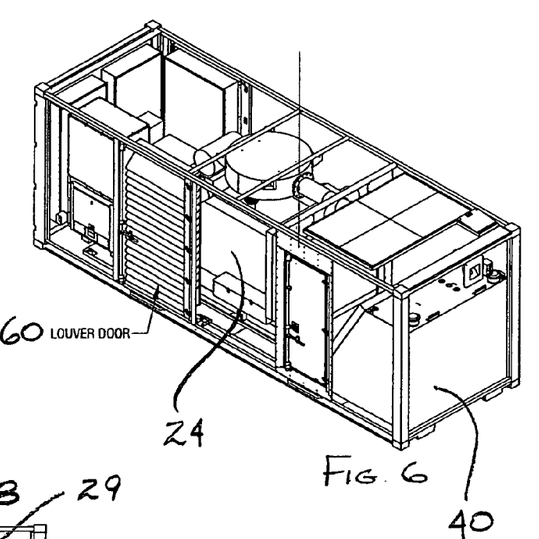
FIG. 6 is a schematic representation of the apparatus of FIG. 3 showing internal details.

FIGS. 4, 5, and 6 show various view of the enclosed assembly of FIGS. 1-3, but with various external walls removed. Referring to FIG. 4, it can be seen that power generator 20 includes an engine 24 such as a diesel engine which operates an electrical generator 26. Waste heat from engine 24 is transferred to an air cooled radiator 28. A quantity of ambient air enters through a forward door 60 and is provided from a fan (not shown) and blows through the heat exchanging core of radiator 28 toward a fuel tank assembly 40 as indicated by arrow 29.

Fuel tank assembly 40 is best seen in FIGS. 7, 8, 9, and 10. Fuel tank assembly 40 includes a plurality of tank surfaces 45 which are adapted and configured to result in at least one boundary of tank 42 having an angled face 46, as best seen in FIGS. 9, 10, 13 and 14. In one embodiment, face 46 is angled about 60 degrees relative to the horizontal, although this angle is only an example, the present invention contemplating other deflection angles. A plurality of fluid couplings 44 for bringing air and fuel into and out of tank 42 are provided on the top surface. A structural matrix 52 is provided on angled face 46 for attachment of deflection and insulation layers as best seen in FIGS. 7, 8, 9, and 10. These layers provide sound deadening, thermal insulation, and protection to tank 42.

Figures 7, 8, 9, 10:
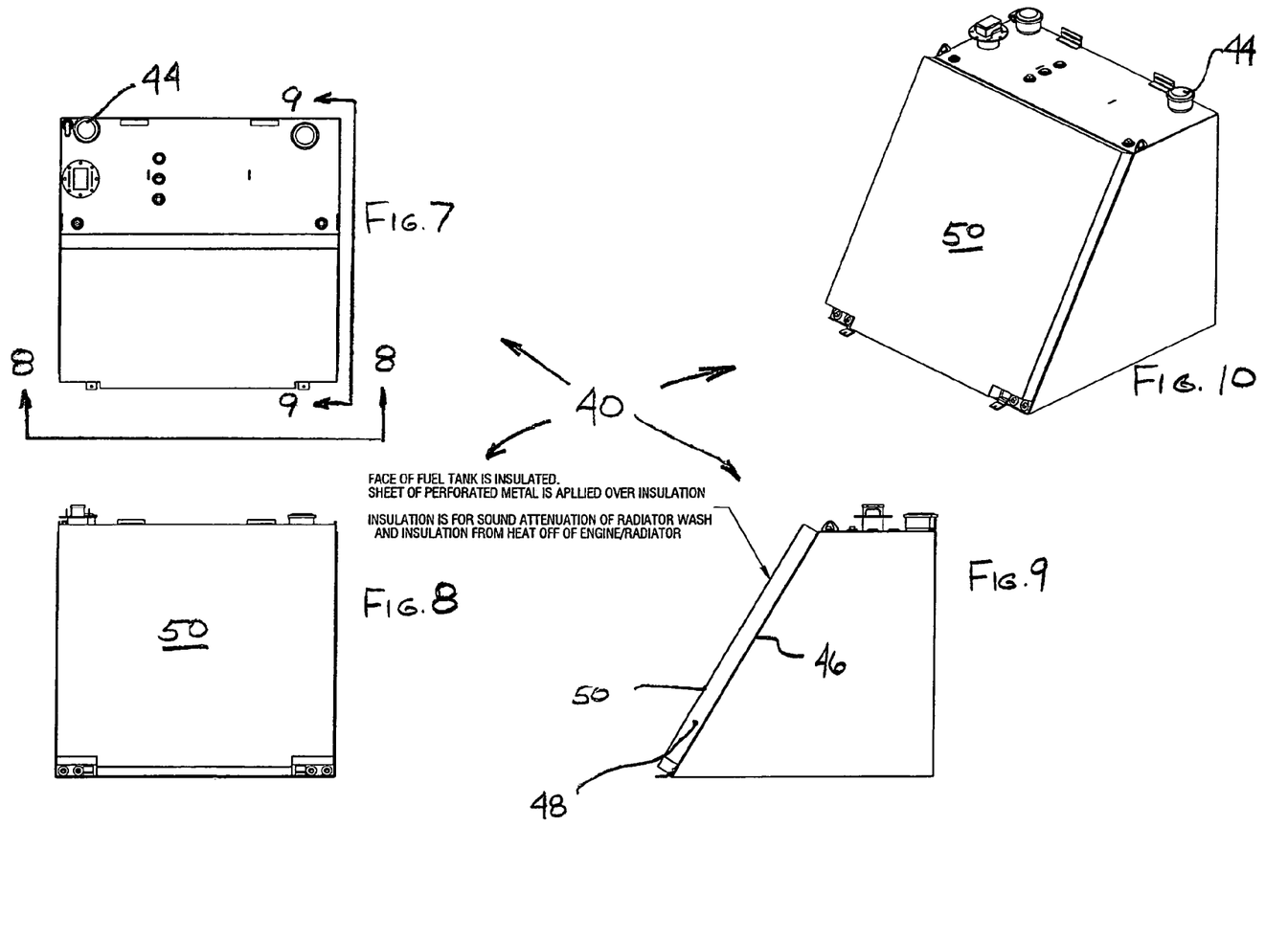
FIG. 7 is a top plan view of a fuel tank assembly according to one embodiment of the present invention.
FIG. 8 is a view of the apparatus of FIG. 7 as taken along line 8-8 of FIG. 7.
FIG. 9 is a view of the apparatus of FIG. 7 as taken along line 9-9 of FIG. 7.
FIG. 10 is a front, top, left side perspective view of the tank of FIG. 7.
Figure 11:
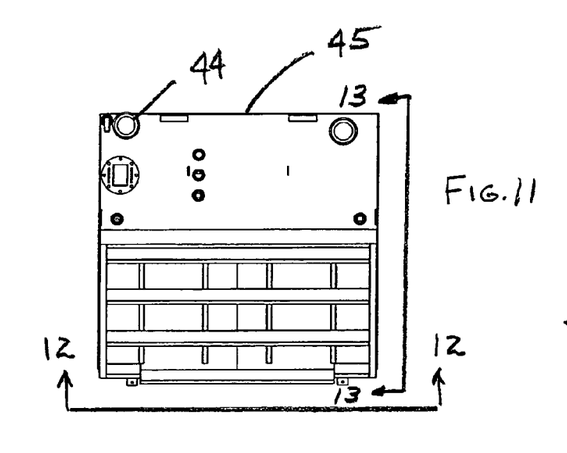
FIG. 11 is a top plan view of a fuel tank according to one embodiment of the present invention.
Figure 12:
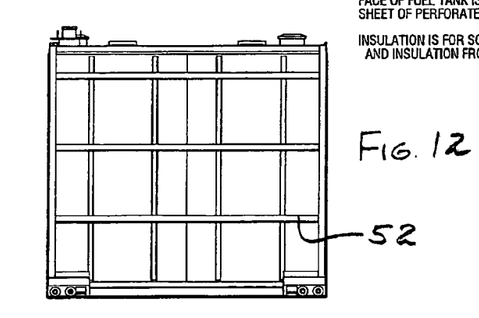
FIG. 12 is a view of the apparatus of FIG. 11 as taken along line 12-12 of FIG. 11.
Figure 13:
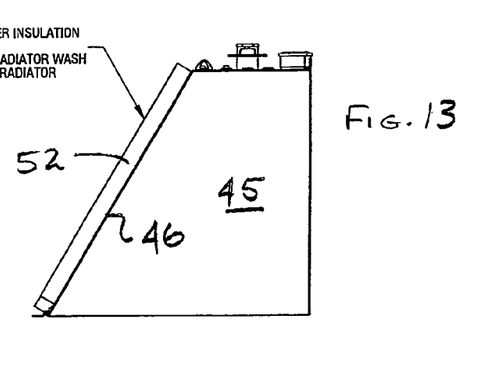
FIG. 13 is a view of the apparatus of FIG. 11 as taken along line 13-13 of FIG. 11.
Figure 14:
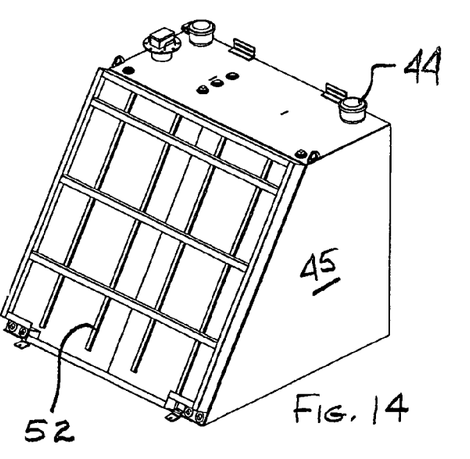
FIG. 14 is a front, top, left side perspective view of the tank of FIG. 11.
Figure 15:
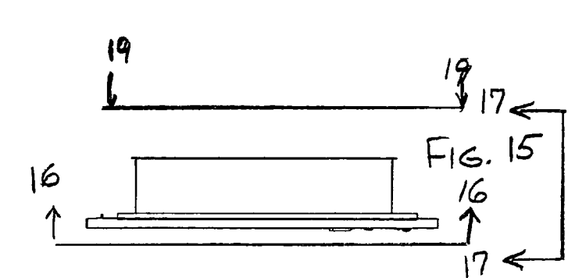
FIG. 15 is a top plan view of a door assembly according to one embodiment of the present invention.
Figure 16:
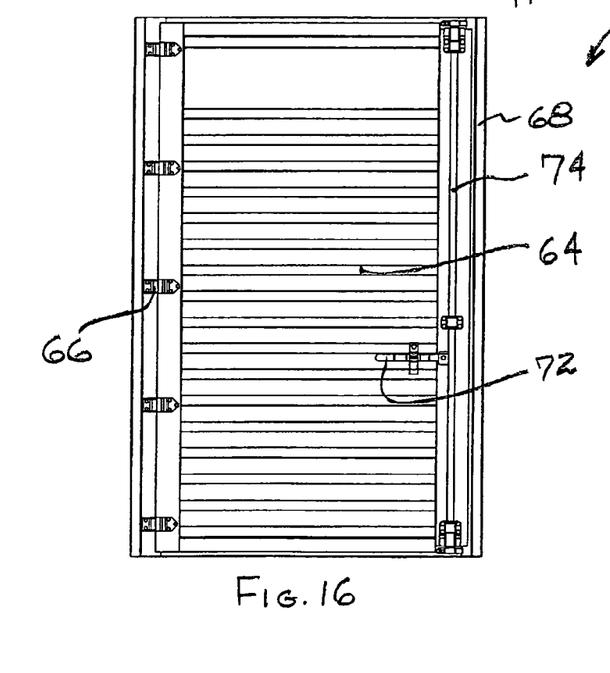
FIG. 16 is a view of the apparatus of FIG. 15 as taken along line 16-16 of FIG. 15.
Figures 17, 18:
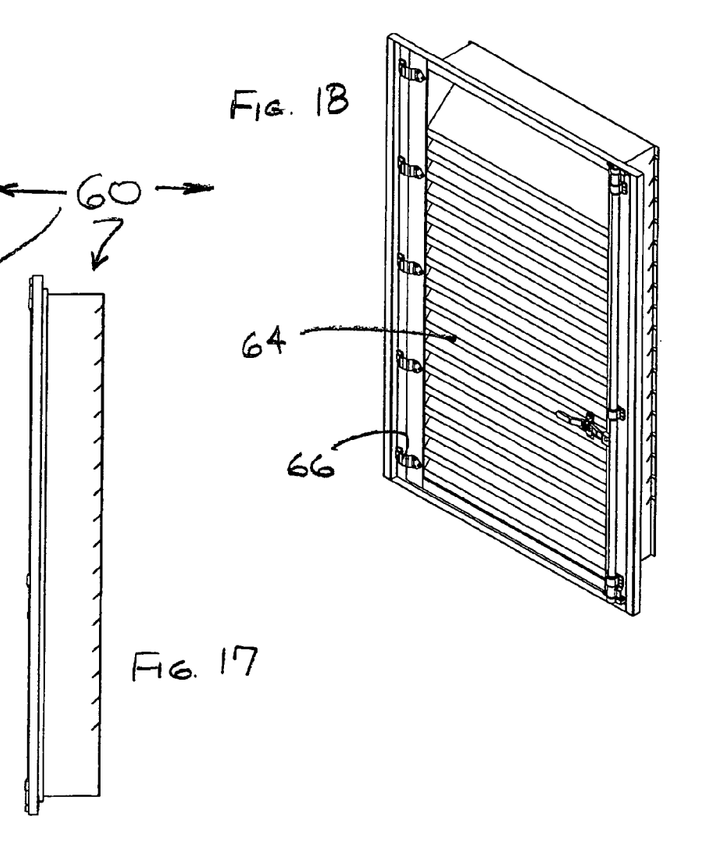
FIG. 17 is a view of the apparatus of FIG. 15 as taken along line 17-17 of FIG. 15.
FIG. 18 is a front, top perspective view of the apparatus of FIG. 15.

Referring to FIG. 9, an insulating layer 48 is held in place on structural matrix 52. Further, a perforated plate 50 is attached to the outside of matrix 52. In one embodiment, perforated plate 50 is a steel plate having a plurality of ⅛ inch throughholes. In some embodiments, plate 50 is an assembly of two perforated plates, spaced apart, and with the holes misindexed such that there is no direct path through both plates. As best seen in FIG. 4, fuel tank assembly 40 is located within enclosure 52 such that air exiting radiator 28 is deflected upward after impinging upon plate 50 to exit enclosure 22 through aperture 23. Insulating layer 48 limits the transfer of heat from the cooling air into the fuel within tank 42 and also attenuates some of the sound that would otherwise vibrate walls of the tank. Perforated plate 50 acts as a guard to protect angled face 46 of tank 42 from any sharp objects that could be propelled in the cooling airflow.

FIGS. 15-21 show various views of a door assembly 60 according to one embodiment of the present invention. Door assembly 60 includes a door 62 hung by a plurality of hinges 66 from a door frame 68. Assembly 60 further includes a handle 72 for operating a door locking mechanism 74.

Figure 19:
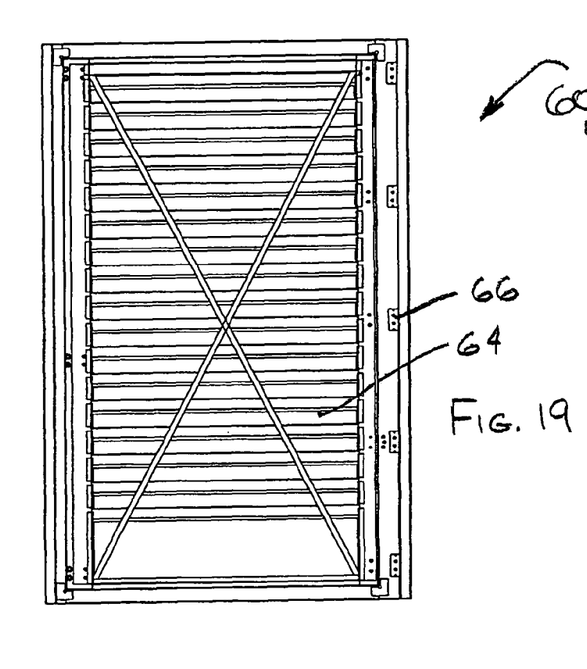
FIG. 19 is a view of the apparatus of FIG. 15 as taken along line 19-19 of FIG. 15.
Figure 20:
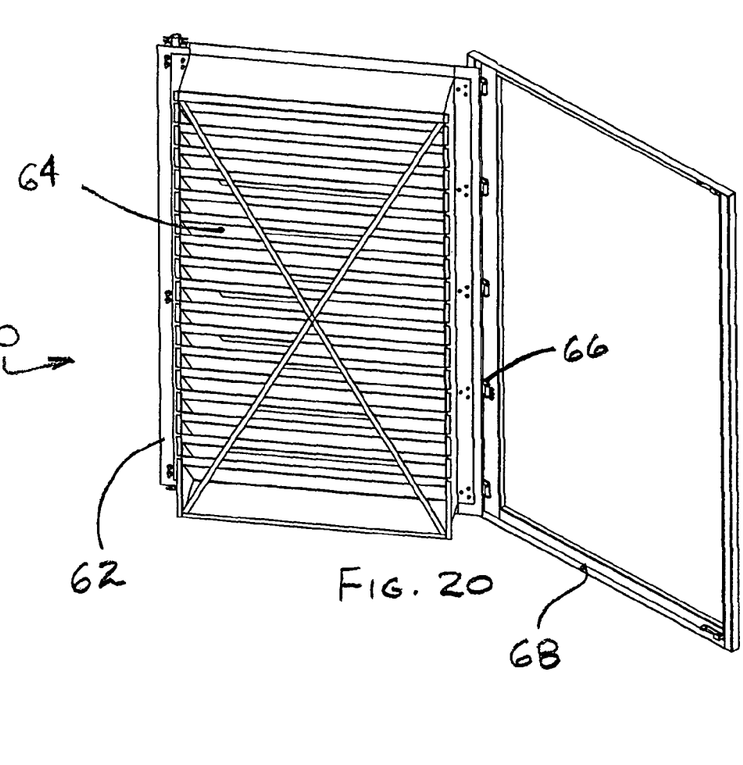
FIG. 20 is a view of the apparatus of FIG. 18 with the door swung open.

In one embodiment, door 60 includes a plurality of flow-through louvers 64 or blades which permit ambient air to enter into and exit from enclosure 22. Preferably, louvers 64 are adapted and configured to permit little resistance to airflow, yet also not permit a person to reach through the louvers. As best seen in FIG. 19, door 62 further includes a pair of diagonal braces for maintaining the squareness of the door.

Figure 21:
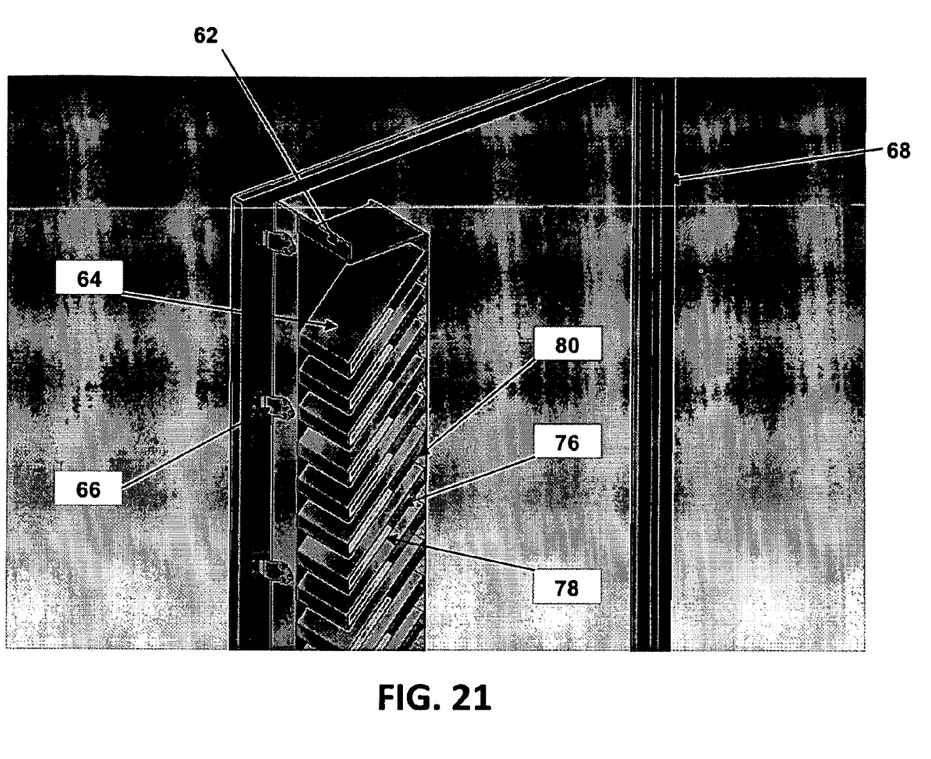
FIG. 21 is a partial cross-sectional view of a portion of the apparatus of FIG. 15.

Referring to FIG. 21, the louvers 64, in one embodiment, include sound-deadening features. Blades 64 include a bottom surface 78 fabricated from perforated metal, such as 0.050 inch thick aluminum, having a plurality of holes that are about 3/32 inches in diameter. The blade further preferably includes a quantity of sound-deadening insulation 76, such as a mineral wool from Thermafiber, or a foam-type. Door 62 preferably includes a screen 80 placed along the interior side of the door to prevent large debris from entering the enclosure.

Figure 22:
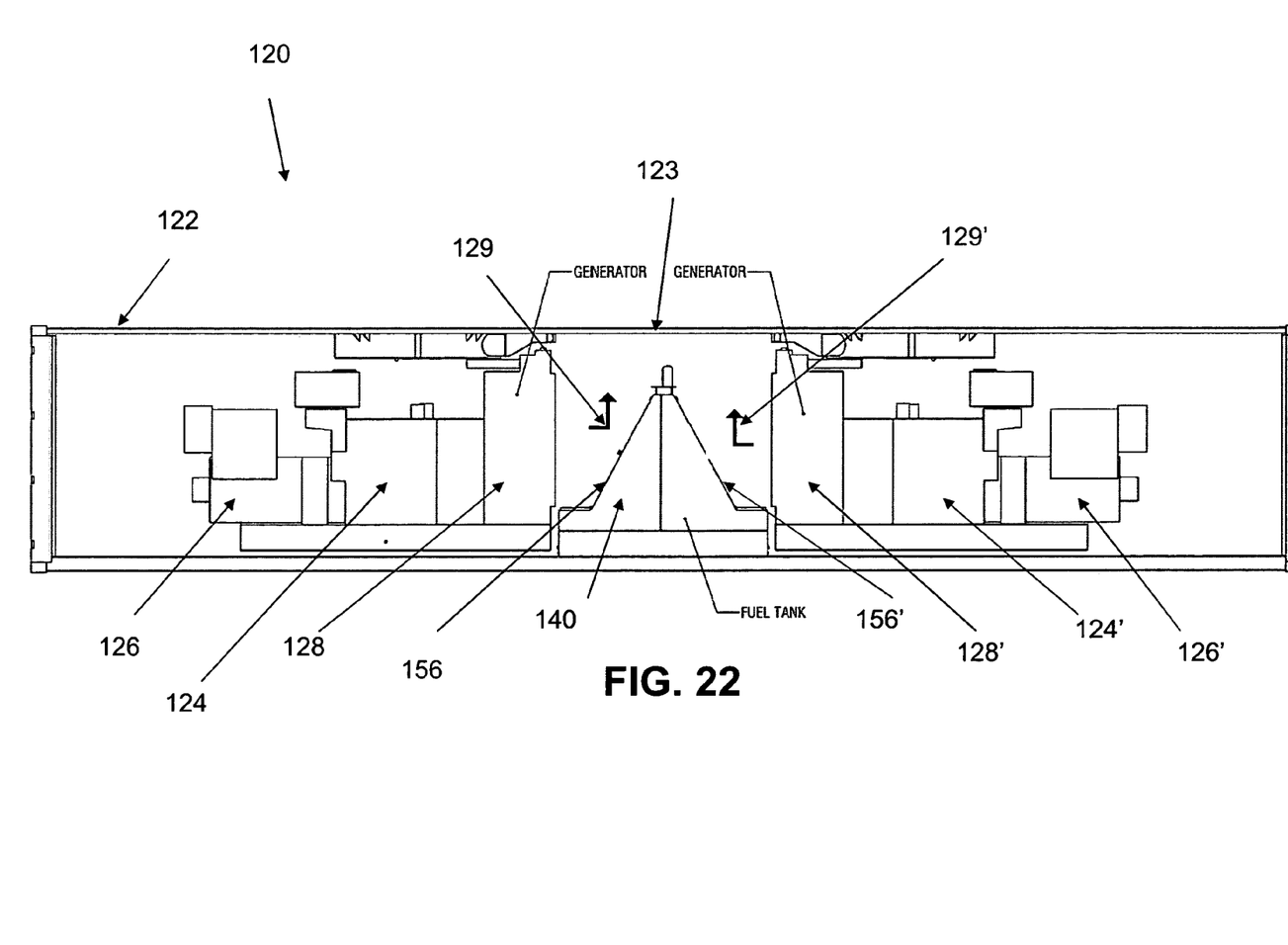
FIG. 22 is a side elevational view of a power generator set according to another embodiment of the present invention drawn to scale.

FIG. 22 shows a side elevational schematic view of a power generator set 120 according to another embodiment of the present invention. In the left half of FIG. 22 it can be seen that generator set 120 includes an engine 124 providing motive power to a generator 126. Waste heat from the engine is rejected to ambient conditions by a radiator or heat exchanger 128. Generator set 120 in one embodiment further includes a second engine 124' driving a generator 126'. Waste heat from engine 124' is rejected to ambient through a heat exchanger 128'. Engine 124 and generator 126 are arranged back-to-back with engine 124' and generator 126'. In some embodiments, the respective center lines of generators 126 and 126' are in general alignment along the same axis. Generator set 120 in some embodiments is enclosed in an enclosure 122 that includes a plurality of louvered panels for entrance and exit of ambient air, and further for suppression of sound.

A fuel tank assembly 140 is centrally located inbetween heat exchangers 128 and 128'. As can be seen by directional arrows 129 and 129', airflow from heat exchangers 128 and 128', respectively, flow toward the center of generator set 120. Air exiting from radiator 128 flows toward insulation assembly 156 which is attached to one side of fuel tank assembly 140. Air exiting heat exchanger 128' flows toward an insulating assembly 156' which is attached to an opposite side of fuel tank 140. Because of the inclination of the insulating assemblies 156 and 156', air impinging on these assemblies is directed upwards and out of the enclosure 122 of generator set 120 through one or more apertures 123 in the roof of enclosure 120.

Figure 23:
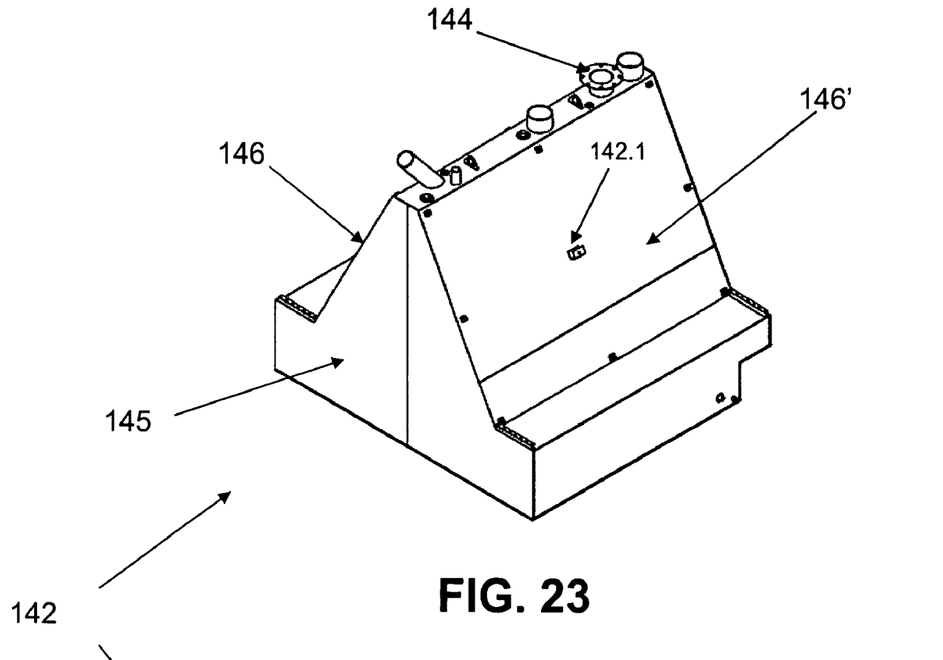
FIG. 23 is a top, left side perspective view of the fuel tank of FIG. 22.
Figure 24:
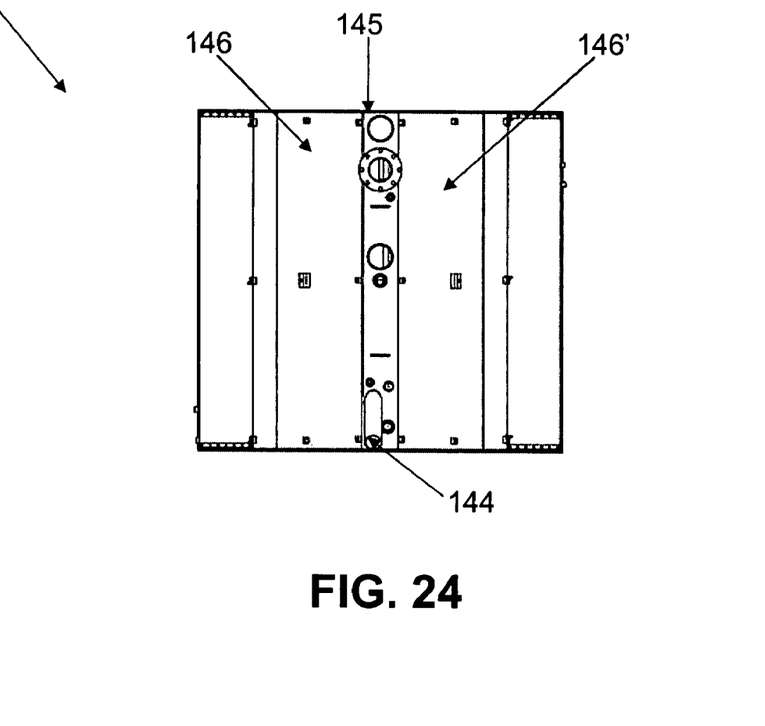
FIG. 24 is a top view of the fuel tank of FIG. 23.

FIGS. 23 and 24 show perspective and top views, respectively, of a fuel tank 142 according to one embodiment of the present invention. Fuel tank 142 is a fuel tank constructed in accordance with standards of the Underwriters Laboratory as a double walled fuel tank. Tank 142 includes a plurality of fluid fittings 144 along a top surface for filling the tank, inspecting the tank, venting the tank, and the like. Tank 142 includes a pair of upwardly angled tank walls 146 and 146' coupled together by complementary-shaped side walls 145. Walls 146 and 146' are angled about 66 degrees relative to the bottom of the tank. Tank 142 includes a plurality of attachment features 142.1 for coupling to the insulation assemblies 156 and 156'.

Figure 25:
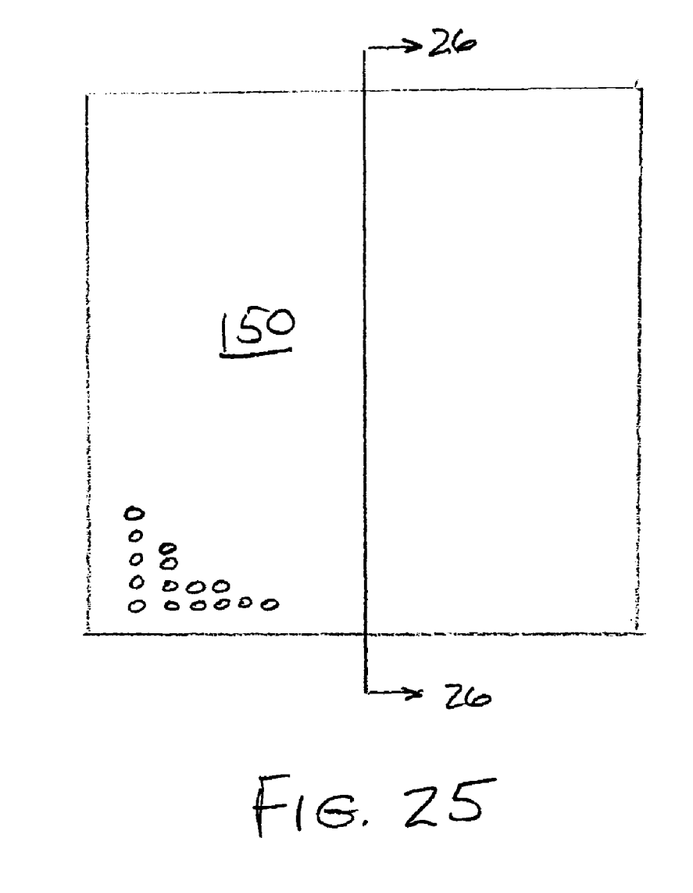
FIG. 25 is an end elevational view of an insulating assembly according to one embodiment of the present invention.
Figure 26:
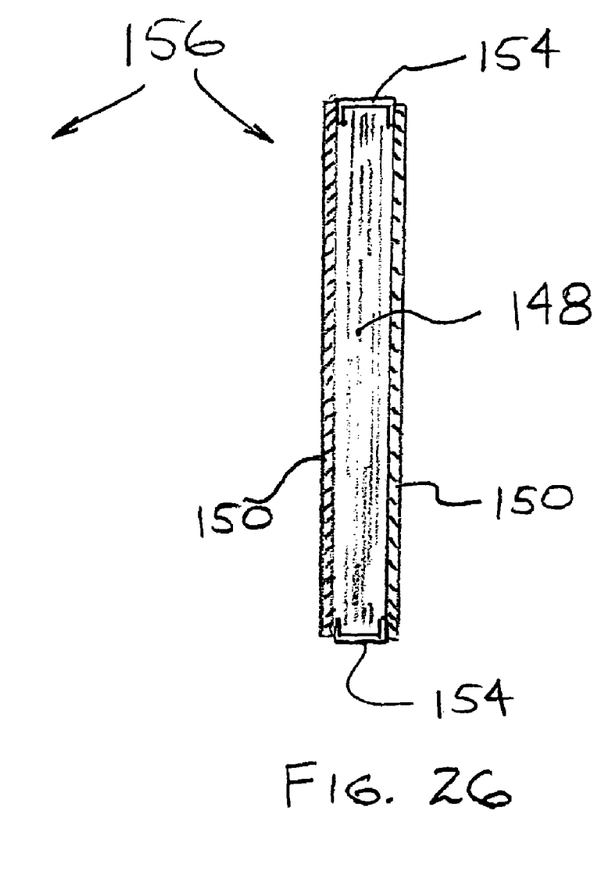
FIG. 26 is a cross sectional view of the apparatus of FIG. 25 as taken along line 26-26.

FIGS. 25 and 26 show end and cross sectional views, respectively, of an insulating assembly or deflector 156 according to one embodiment of the present invention. In one embodiment, assembly 156 includes an outer frame of structural members 154 such as C-channel extrusions. A quantity of insulating material 148 is located generally within the center of this frame. In one embodiment, insulating material 148 is a matte of fiberglass. However, the present invention also contemplates embodiments using other types of insulating material, including rigid insulating material, and further includes those embodiments in which there is no insulating material within assembly 156.

In some embodiments, insulating assembly 156 further includes generally planar sheet metal covers 150. In one embodiment, each cover 150 is fabricated from perforated aluminum sheet metal, although other embodiments of the present invention contemplate a single face being solid, and also those embodiments in which both faces are substantially solid. In yet other embodiments of the present invention the deflecting assembly 156 comprises a sheet metal surface such as a cover 150. In these embodiments this deflector can be angled relative to the flow stream of the air exhausting from the heat exchanger so as to deflect the flow stream away from substantial impingement on the fuel tank. In such embodiments, the fuel tank may be of any construction, including substantially rectangular fuel not having the angled surfaces 146 or 46 as shown herein. Instead, the deflector 156 provides the function of keeping the exhausted flow stream away from the fuel tank.

Although what has been shown and described is a fuel tank having an angled face with an insulating assembly attached to that angled face, the present invention is not so limited. Yet other embodiments of the present invention contemplate fuel tanks of any configuration with a deflecting member placed in front of the fuel tank to direct the air exhausting from the radiator. In addition, what has been shown and described is a generator set in which a fuel tank 142 and insulating deflector 156 deflect air upward, yet other embodiments of the present invention contemplate deflection of air from the radiator laterally out from a side of enclosure 122.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these myriad combinations is excessive and unnecessary.

While the inventions have been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A system for generating electrical power, comprising:
   an electrical generator;
   a heat engine for driving said generator, said engine burning fuel and producing waste heat;
   an air cooled heat exchanger for rejecting the waste heat into a stream of ambient air flowing along a path in a first direction;
   a fuel tank for supplying fuel to said engine, said tank including a first surface; and
   an enclosure having an interior volume containing said generator, said heat engine, said heat exchanger, and said fuel tank, said enclosure having an aperture;
   wherein the stream of heated air is deflected by the first surface of said tank to flow along a second direction different than the first direction, said deflected air exiting the volume of said enclosure through said aperture.

2. The system of claim 1 which further comprises a thermally insulating assembly attached to the first surface.

3. The system of claim 2 wherein said thermally insulating assembly includes an outer cover for deflecting the heated air and a layer of thermally-insulating material placed in between said outer cover and said first surface.

4. The system of claim 3 wherein said outer cover is perforated.

5. The system of claim 1 wherein the second direction is substantially upward.

6. The system of claim 5 wherein the first direction is substantially horizontal.

7. The system of claim 1 wherein said tank is a double walled fuel tank having a flat bottom and said first surface is angled from the bottom more than about 30 degrees and less than about 80 degrees.

8. The system of claim 1 wherein said first surface is angled more than about 45 degrees from the bottom and less than about 70 degrees 9. The system of claim 1 further comprising:
   a second electrical generator driven by a second heat engine, and a second air cooled heat exchanger for rejecting waste heat from said second engine in a second flow stream in a third direction different than the first direction;
   wherein said tank includes a second surface, the stream of heated air is a first stream, and the second stream of heated air is deflected by the second surface of said tank to flow along the second direction.

10. The system of claim 9 wherein the third direction is generally opposite of the first direction and said fuel tank is located in between said first heat exchanger and said second heat exchanger.

11. The system of claim 9 wherein the second direction is substantially upward.

12. The system of claim 9 wherein said first surface is angled to direct the first flow stream upward, said second surface is angled to direct the second flow stream upward, and which further comprises a first deflector attached to and spaced apart from said first surface, and a second deflector attached to and spaced apart from said second surface.

13. The system of claim 12 wherein said first deflector is perforated and said second deflector is perforated.

14. The system of claim 9 which further comprises:
   a first layer of thermal insulation insulating said first surface of said tank; and
   a second layer of thermal insulation insulating said second surface of said tank.

15. The system of claim 9 wherein said tank is a double walled fuel tank having a flat bottom and said first surface and said second surface are on opposite sides, said first surface being angled from the bottom more than about 30 degrees and less than about 80 degrees, said second surface being angled from the bottom more than about 30 degrees and less than about 80 degrees.

16. The system of claim 15 wherein said first surface is angled more than about 45 degrees from the bottom and less than about 70 degrees, said second surface is angled more than about 45 degrees from the bottom and less than about 70 degrees.

17. The system of claim 15 which further comprises an external top opposite of said bottom and in between said first surface and said second surface, said top including at least one fitting for introduction of fuel into the interior of said tank.

18. The system of claim 9 wherein the deflected second stream flows through said aperture.

* * * * *